3,463,775

17α-METHYL-RETROSTEROIDS

Arthur Boller, Binningen, Andor Furst, Basel, and Marcel Muller, Frenkendorf, Switzerland, assignors to Hoffmann-La Roche Inc., Nutley, N.J., a corporation of New Jersey
No Drawing. Filed May 3, 1967, Ser. No. 635,691
Claims priority, application Switzerland, May 17, 1966, 7,114/66
Int. Cl. C07c *169/34;* A61k *17/06*
U.S. Cl. 260—239.55   2 Claims

ABSTRACT OF THE DISCLOSURE

17α-methyl-9β,10α-pregn-4-ene-3,20-dione is prepared. This compound is useful as a progestational agent. It is gestagenically active and induces the formation of deciduum.

DETAILED DESCRIPTION OF THE INVENTION

This invention is concerned with 17α-methyl-9β,10α-pregn-4-ene-3,20-dione, i.e., a compound of the formula:

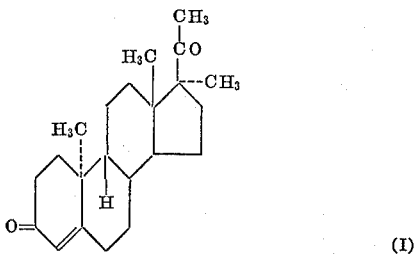

The compound of Formula I is prepared from 9β,10α-pregna-4,16-diene-3,20-dione of the formula:

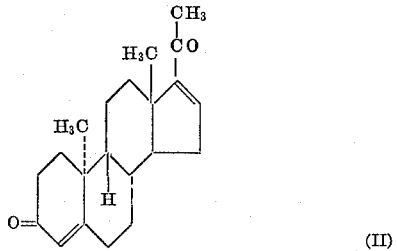

The compound of Formula II is converted to the compound of Formula I by a three-step procedure involving protecting the 3-keto group, reductively methylating and then splitting off the protecting group from the reaction product.

The 3-keto group can be protected in a manner known per se. It is preferably protected via ketalization, i.e., conversion into a ketal moiety. A specifically preferred protecting group is that resulting from ketalization with ethylene glycol; i.e., a preferred protected moiety is the ethylenedioxy moiety (i.e., the ethylene ketal). Following the reductive methylation, the protecting group can be split off regenerating the 3-keto group by treatment of the methylation product with acids, for example, acetic acid, p-toluenesulfonic acid in acetone or aqueous methanol or sulfuric acid.

The reductive methylation can also be carried out in a manner known per se, for example, by treatment of the compound of Formula II protected in the 3-position with an alkali metal (e.g., with lithium) in ammonia and subsequent reaction of the reaction mixture with a methyl halide (e.g., methyl iodide, methyl bromide, methyl chloride, preferably with methyl iodide). In one convenient technique for accomplishing the reductive methylation, the starting material, i.e., the compound of Formula II having a protected 3-keto group is dissolved in an inert solvent therefor, and there is then added to this solution a solution of the alkali metal in ammonia to a point where the reaction mixture is decolorized, whereupon the methyl halide is added to the reaction mixture.

The compound of Formula I, i.e., 17α-methyl-9β,10α-pregn-4-ene-3,20-dione is endocrinologically useful. More particularly, it is useful as a progestational agent. In particular, on oral administration it is gestagenically active and has the additional advantage that it induces the formation of deciduum. It can be used in the form of conventional pharmaceutical preparations (dosage unit 2–6 mg.) which contain it in admixture with a conventional organic or inorganic inert carrier material which is suitable for enteral or parenteral administration. Such conventional organic or inorganic inert pharmaceutical carrier materials are, for example, water, gelatin, lactose, starch, magnesium stearate, talc, vegetable oils, gums, polyalkyleneglycol, Vaseline, and the like. The dosage should, of course, be individualized with respect to the particular subject being treated and the best judgment of the person administering the compound. It can be administered in conventional pharmaceutical dosage forms, that is, either in conventional solid pharmaceutical dosage forms, e.g., tablets, dragees, suppositories, capsules or the like, or in conventional liquid pharmaceutical dosage forms, e.g., solutions, suspensions, or emulsions. They may be subjected to conventional pharmaceutical expedients such as sterilization and/or contain conventional pharmaceutical additives such as preservatives, stabilizing agents, wetting agents, emulsifying agents, salts for adjusting the osmotic pressure, or buffers.

The following example is illustrative of the invention and not limitative thereof.

EXAMPLE

A solution of 20 g. of 3,3-ethylenedioxy-9β,10α-pregna-5,16-dien-20-one [M.P. 161–163° C., $\epsilon_{238}=10{,}500$, manufactured from 9β,10α-pregna-4,16-diene-3,20-dione according to the method of F. Sondheimer, M. Velasco and G. Rosenkranz, J. Amer. Chem. Soc. 77, 192 (1955)] in 375 ml. of absolute tetrahydrofuran is added dropwise to a stirred solution of 0.785 g. of lithium in 1 liter of liquid ammonia (previously dried with lithium). The originally blue reaction mixture gradually loses its color. To the resultant milky solution there is added dropwise a solution of 20 ml. of methyl iodide in 30 ml. of tetrahydrofuran. The reaction mixture is then stirred for one hour, a further 20 ml. of methyl iodide is added and the mixture is then stirred for a further 18 hours, the ammonia being allowed to evaporate. After the addition of 10 g. of ammonium chloride and 500 ml. of water, the reaction mixture is extracted with ether.

The ether extracts are combined and yield 14 g. of crude 3,3-ethylenedioxy-17α-methyl-9β,10α-pregn-5-en-20-one. This product in a mixture of 400 ml. of methanol and 40 ml. of 8 percent sulfuric acid is heated under reflux for 40 minutes, most of the methanol is then removed in vacuo and the reaction mixture, after the addition of 200 ml. of water, is extracted with methylene chloride. The methylene chloride extracts, washed neutral, yield, after drying and evaporation of the solvent, 9.5 g. of crude 17α-methyl-9β,10α-pregn-4-ene-3,20-dione which, after repeated recrystallization from acetone/hexane, melts at 126–127° C. $[\alpha]_{589}=-131°$ (dioxane, c.=0.1 percent), $\epsilon_{239.5}=17250$ (in rectified spirit).

Tablet formulation

| | Mg. |
|---|---|
| 17α-methyl-9β,10α-pregn-4-ene-3,20-dione | 2 |
| Lactose | 60 |
| Starch | 36 |
| Talc | 1.8 |
| Magnesium stearate | 0.2 |
| Total weight | 100.0 |

What is claimed is:
1. 17α-methyl-9β,10α-pregn-4-ene-3,20-dione.
2. 3,3-ethylenedioxy-17α-methyl - 9β,10α - pregn-5-en-20-one.

References Cited

Chemistry and Industry (1963), pp. 118–119 relied on. Article by Weiss et al.

ELBERT L. ROBERTS, Primary Examiner

U.S. Cl. X.R.

260—397.3; 424—242